(12) United States Patent
Hoshikawa et al.

(10) Patent No.: US 7,792,825 B2
(45) Date of Patent: Sep. 7, 2010

(54) FAST SELECT FOR FETCH FIRST N ROWS WITH ORDER BY

(75) Inventors: Akiko Hoshikawa, San Jose, CA (US); Allan B. Lebovitz, Morgan Hill, CA (US); Akira Shibamiya, Los Altos, CA (US)

(73) Assignee: International Business Machines Corporation, Armonk, NY (US)

( * ) Notice: Subject to any disclaimer, the term of this patent is extended or adjusted under 35 U.S.C. 154(b) by 365 days.

(21) Appl. No.: 11/222,894

(22) Filed: Sep. 8, 2005

(65) Prior Publication Data

US 2007/0061280 A1    Mar. 15, 2007

(51) Int. Cl.
    *G06F 17/30* (2006.01)
(52) U.S. Cl. .......... 707/723; 707/736; 707/748; 707/752; 707/754
(58) Field of Classification Search .......... 707/2, 707/7, 3, 100, 748, 735, 723, 752, 754, 999.002, 707/999.003, 999.004; 711/108
    See application file for complete search history.

(56) References Cited

U.S. PATENT DOCUMENTS

| | | | | |
|---|---|---|---|---|
| 4,209,845 A | * | 6/1980 | Berger et al. | 707/7 |
| 4,417,321 A | * | 11/1983 | Chang et al. | 707/7 |
| 5,802,357 A | * | 9/1998 | Li et al. | 707/2 |
| 6,546,382 B1 | * | 4/2003 | Amor et al. | 707/2 |
| 6,708,273 B1 | * | 3/2004 | Ober et al. | 713/189 |
| 7,191,171 B2 | * | 3/2007 | Lin | 707/2 |
| 2004/0044683 A1 | * | 3/2004 | Shinji | 707/103 R |
| 2004/0049630 A1 | * | 3/2004 | Stark | 711/108 |
| 2005/0004924 A1 | * | 1/2005 | Baldwin | 707/100 |
| 2005/0076018 A1 | * | 4/2005 | Neidecker-Lutz | 707/3 |
| 2006/0101086 A1 | * | 5/2006 | Ray et al. | 707/200 |
| 2006/0248079 A1 | * | 11/2006 | Braica | 707/7 |

OTHER PUBLICATIONS

Skeina, The Algorthm Design Manual, Jun. 2, 1997, pp. 1-4.*

* cited by examiner

*Primary Examiner*—John R. Cottingham
*Assistant Examiner*—Sherief Badawi
(74) *Attorney, Agent, or Firm*—Toler Law Group (57) ABSTRACT

A method for fetching an ordered first N rows of a table, includes: reading a row in the table; determining that the read row qualifies as the first N rows of the table for rows read so far, and storing data of the read row; and determining an order of data of qualifying rows and storing the order. Only data in rows that qualify to be among the first N rows are ordered and stored. This provides a significantly more efficient processing. It eliminates tournament tree sorts, corresponding work file read and write I/O's, and associated CPU time. This reduces the time for the running of a query and improves the performance of other applications sharing the use of work files. Further, the improved performance is particular significant when the buffer sizes are within a page of records or rows, although multiple pages may be used.

20 Claims, 6 Drawing Sheets

| 1 | 2 | 3 | | N |
|---|---|---|---|---|
| D1K1 | D2K2 | D3K3 | - - - - - | DNKN |

Data Buffer 201

| d1 | k1 | d1 | k1 | - - - - - | dn | kn |
|---|---|---|---|---|---|---|

Offset Buffer 202

| pos # | pos # | pos # | - - - - - | pos # |
|---|---|---|---|---|

Order Buffer 203

FIG. 1

| 1 | 2 | 3 | | N |
|---|---|---|---|---|
| D1K1 | D2K2 | D3K3 | - - - - - | DNKN |

Data Buffer 201

| d1 | k1 | d1 | k1 | - - - - - | dn | kn |
|---|---|---|---|---|---|---|

Offset Buffer 202

| pos # | pos # | pos # | - - - - - | pos # |
|---|---|---|---|---|

Order Buffer 203

Read in Q,05

| 1 | 2 | 3 | 4 | 5 | 6 | 7 | 8 | 9 | 10 | 201 |
|---|---|---|---|---|---|---|---|---|---|---|
| F01F | L02L | C03C | X04X | Q05Q | | | | | | |

| | | | | | | | | | | 203 |
|---|---|---|---|---|---|---|---|---|---|---|
| 3 | 1 | 2 | 5 | 4 | | | | | | |

FIG. 4D

Read in M,06

| 1 | 2 | 3 | 4 | 5 | 6 | 7 | 8 | 9 | 10 | 201 |
|---|---|---|---|---|---|---|---|---|---|---|
| F01F | L02L | C03C | X04X | Q05Q | M06M | | | | | |

| | | | | | | | | | | 203 |
|---|---|---|---|---|---|---|---|---|---|---|
| 3 | 1 | 2 | 6 | 5 | 4 | | | | | |

FIG. 4E

Read in T,07; A,08;, D,09; S,10

| 1 | 2 | 3 | 4 | 5 | 6 | 7 | 8 | 9 | 10 | 201 |
|---|---|---|---|---|---|---|---|---|---|---|
| F01F | L02L | C03C | X04X | Q05Q | M06M | T07T | A08A | D09D | S10S | |

| | | | | | | | | | | 203 |
|---|---|---|---|---|---|---|---|---|---|---|
| 8 | 3 | 9 | 1 | 2 | 6 | 5 | 10 | 7 | 4 | |

FIG. 4F

Read in E,11

| 1 | 2 | 3 | 4 | 5 | 6 | 7 | 8 | 9 | 10 | 201 |
|---|---|---|---|---|---|---|---|---|---|---|
| F01F | L02L | C03C | E11E | Q05Q | M06M | T07T | A08A | D09D | S10S | |
| 8 | 3 | 9 | 4 | 1 | 2 | 6 | 5 | 10 | 7 | 203 |

FIG. 4G

Read in Z,12

| 1 | 2 | 3 | 4 | 5 | 6 | 7 | 8 | 9 | 10 | 201 |
|---|---|---|---|---|---|---|---|---|---|---|
| F01F | L02L | C03C | E11E | Q05Q | M06M | T07T | A08A | D09D | S10S | |
| 8 | 3 | 9 | 4 | 1 | 2 | 6 | 5 | 10 | 7 | 203 |

FIG. 4H

Read in R,13

| 1 | 2 | 3 | 4 | 5 | 6 | 7 | 8 | 9 | 10 | 201 |
|---|---|---|---|---|---|---|---|---|---|---|
| F01F | L02L | C03C | E11E | Q05Q | M06M | R13R | A08A | D09D | S10S | |
| 8 | 3 | 9 | 4 | 1 | 2 | 6 | 5 | 7 | 10 | 203 |

FIG. 4I

FAST SELECT FOR FETCH FIRST N ROWS WITH ORDER BY

FIELD OF THE INVENTION

The present invention relates to the sorting of rows in a table, and more particularly to the fetching of first N rows without sorting all the rows of the table.

BACKGROUND OF THE INVENTION

The Fetch First N Rows Only clause in DB2™ enables optimized processing, especially for queries with potentially large result sets when only a limited number of resulting rows is requested. For example, in Fetch First 10 Rows with Order By, it would generally be more efficient to use a non-matching non-clustering index rather than a tablespace scan followed by a sort, especially for a large table with many qualifying rows. However, there can be a severe performance problem if there is no index available on an order by key. In this case, for 100 million row table, up to 100 million rows must be read and sorted, which requires many work file read and write I/O's for multiple sort/merge passes. Then only 10 rows would be read from the sorted result work file. This can consume an enormous amount of resources from both the Input/Output device and processor, which not only delays the particular query, but also potentially many other applications which may share the work file data sets.

Accordingly, there exists a need for a method for a fast fetching of ordered first N rows of a table. The method should fetch the ordered first N rows of a table without requiring work file read and write I/O's, thus providing significantly higher efficiency. The present invention addresses such a problem.

SUMMARY OF THE INVENTION

A method for fetching an ordered first N rows of a table, includes: reading a row in the table; determining that the read row qualifies as the first N rows of the table for rows read so far, and storing data of the read row; and determining an order of data of qualifying rows and storing the order. Only data in rows that qualify to be among the first N rows are ordered and stored. This provides a significantly more efficient processing. It eliminates tournament tree sorts, corresponding work file read and write I/O's, and associated CPU time. This reduces the time for the running of a query and improves the performance of other applications sharing the use of work files. Further, the improved performance is particular significant when the buffer sizes are within a page of records or rows, although multiple pages may be used.

DETAILED DESCRIPTION

The present invention provides a method for a fast fetching of ordered first N rows of a table. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

To more particularly describe the features of the present invention, please refer to FIGS. 1 through 4I in conjunction with the discussion below.

Figure 1:
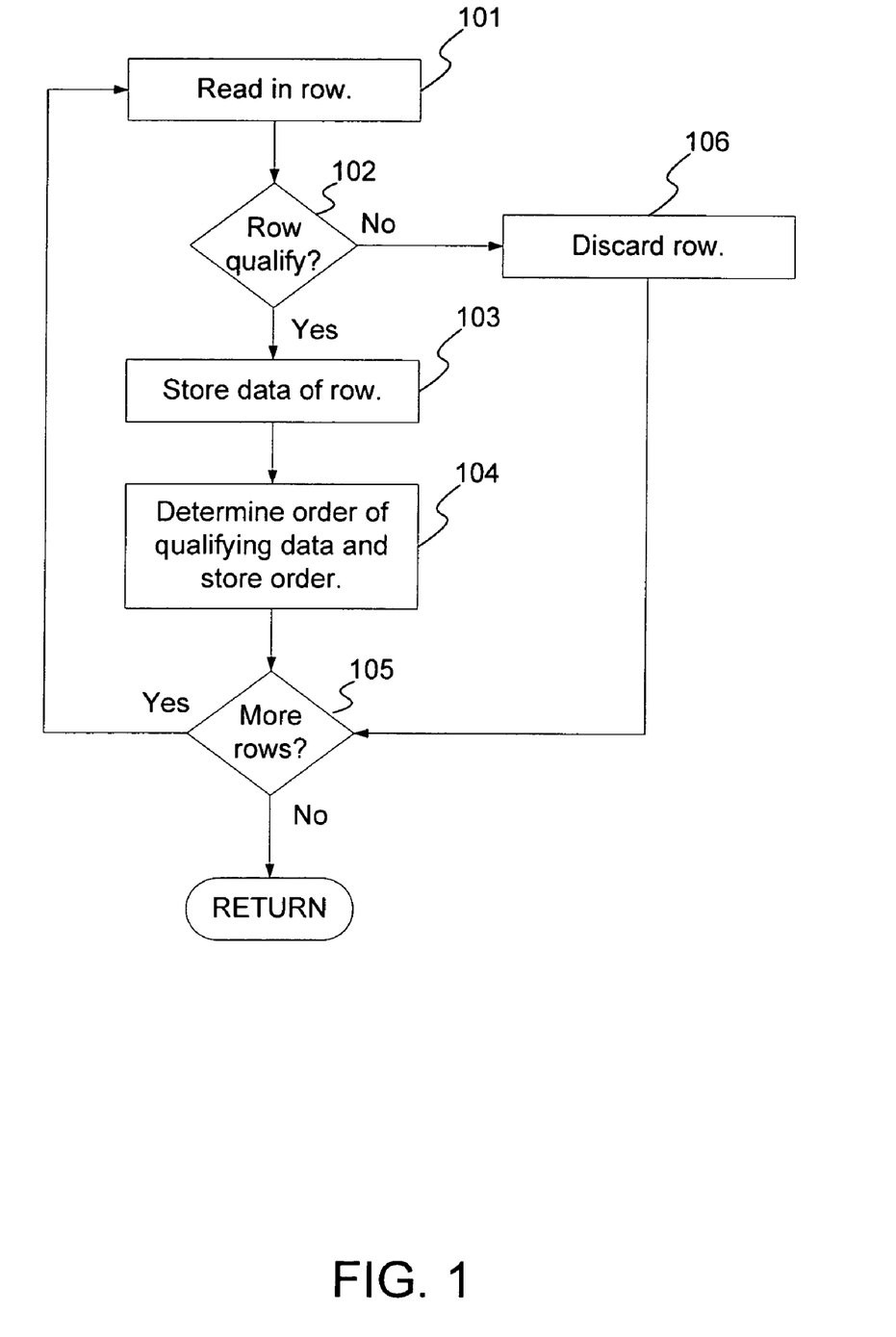
FIG. 1 is a flowchart illustrating an embodiment of a method for a fast fetching of ordered first N rows of a table in accordance with the present invention.

FIG. 1 is a flowchart illustrating an embodiment of a method for a fast fetching of ordered first N rows of a table in accordance with the present invention. In processing a query to fetch an ordered first N rows from a table, first a row in the table is read, via step 101. It is then determined if the row qualifies to be one of the first N rows read so far, via step 102. If the row qualifies, then the data in the row is stored along with the other qualifying data, via step 103. In this embodiment, the qualifying data are stored in virtual memory instead of a work file, which is typically written to disk. The qualification of the row may mean that the data of a previously read row no longer qualifies. The data of this previously read row would then be discarded, while the data of the current qualifying row is stored per step 103. Next, the order of the qualifying data is determined and stored, via step 104. If the row data does not qualify, via step 102, then it is discarded, via step 106. If more rows in the tables remain to the read, then steps 101 through 106 are repeated for the next row.

Figure 2:
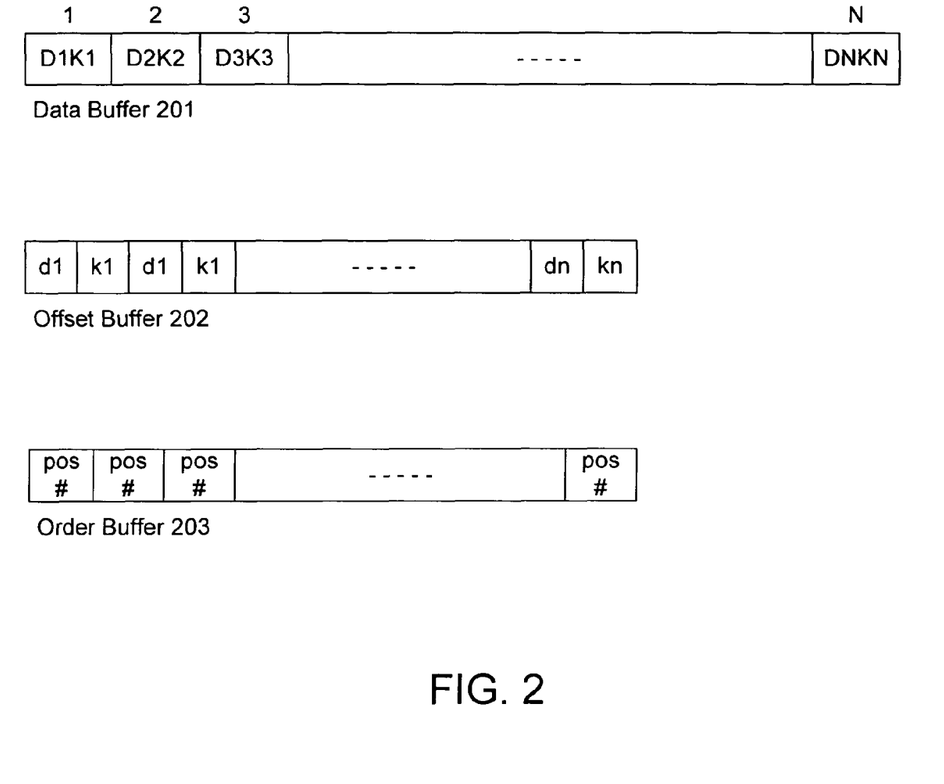
FIG. 2 illustrates the buffers used by the method in accordance with the present invention.

FIG. 2 illustrates the buffers used by the method in accordance with the present invention. The buffers comprise a data buffer 201, an offset buffer 202, and an order buffer 203. The data buffer 201 stores the data and key of the qualifying rows. The length of the data buffer 201 depends upon the lengths of the data and keys, and the number of rows to be fetched. The offset buffer 202 stores the offsets from a base address of the data buffer 201 for each data and key stored therein. Each data/key offset corresponds to a position number, indicating the location in the data buffer 201 at which a data/key are stored. The order buffer 203 stores the order of the current qualifying data as an array of the position numbers. For example, if the first 10 rows are to be fetched, each position can be a simple integer between 1 and 10, with each integer corresponding to an offset, and each offset corresponding to a location in the data buffer 201. As rows are read, via step 101, and qualify, via step 102, their data are stored in the data buffer 201 in one of the positions, via step 103. The order of these qualifying data is then determined, via step 104, and the position numbers stored in the order buffer 203 are shifted to reflect this order. With these buffers 201-203, the data and keys stored in the data buffer 201 need not be moved each time the order of qualifying data change. Instead, only the position numbers stored in the order buffer 203 are changed.

In this manner, only data in rows that qualify to be among the first N rows are ordered and stored. This provides a significantly more efficient processing. It eliminates tournament tree sorts, corresponding work file read and write I/O's, and associated CPU time. This not only reduces the time for the running of a query, it also improves the performance of other applications sharing the use of work files by preventing performance disruption due to the monopolization of shared work files. Further, the improved performance is particularly significant when the buffer sizes are within a page of records or rows, although multiple pages may be usedEfficiency can be further increased by using a binary search of the order buffer 203 in sorting qualified rows until the search area is less than 5 entries, and then using a sequential search thereafter.

Figure 3:
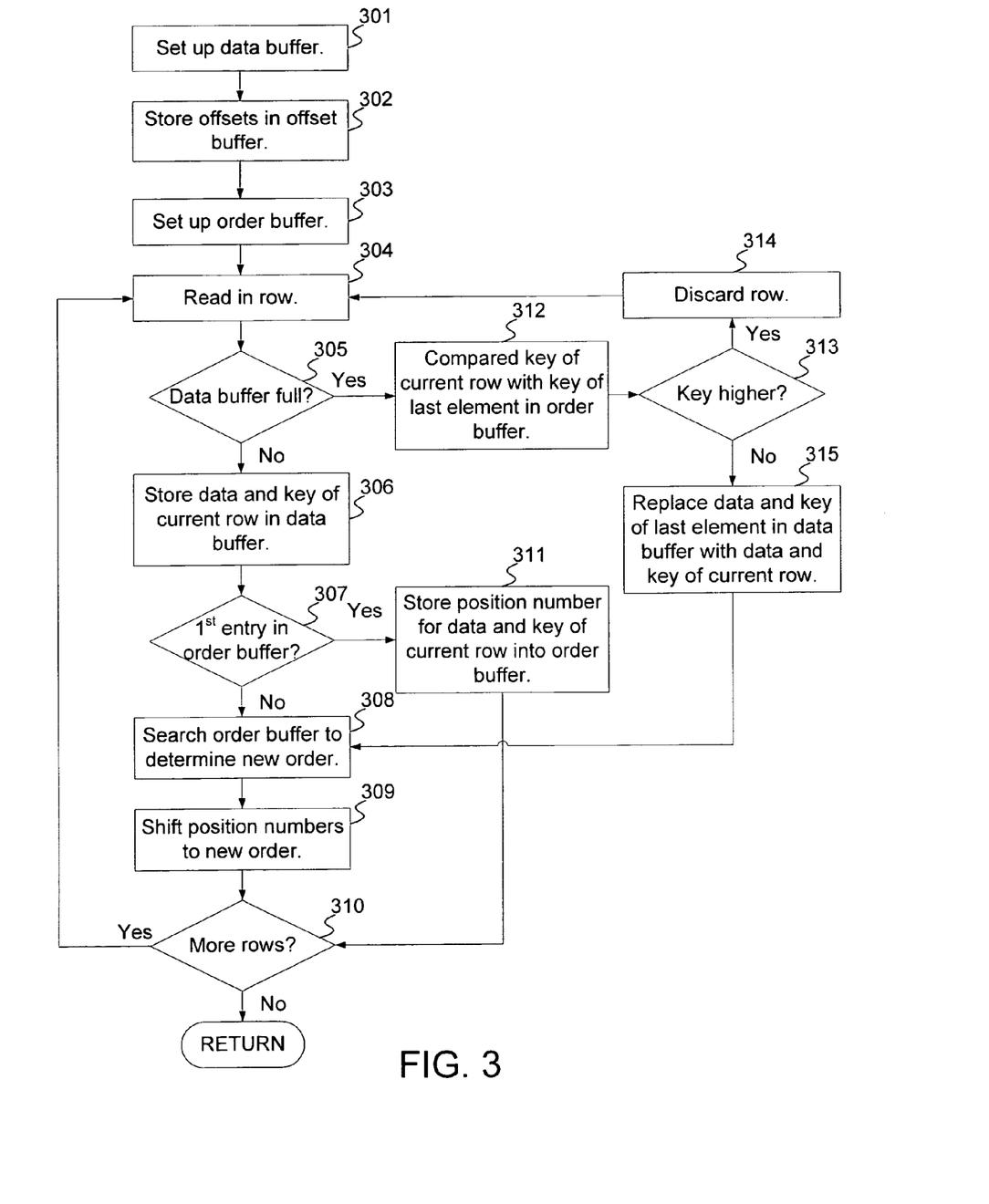
FIG. 3 is a flowchart illustrating in more detail the method for a fast fetching of ordered first N rows of a table in accordance with the present invention.

FIG. 3 is a flowchart illustrating in more detail the method for a fast fetching of ordered first N rows of a table in accordance with the present invention. First, a data buffer 201 is set up, via step 301. In this embodiment, the length of the data buffer 201 is (data length+key length)×number of rows. Once the data buffer 201 is set up, the offsets from the base address of the data buffer 201 are stored in the offset buffer 202, via step 302. An order buffer 203 is also set up to store position numbers, with its length based on the number of rows to be fetched, via step 303.

Next, a row of a table is read, via step 304. If the data buffer 201 is not yet full, via step 305, then the data and key of the current row is stored in the data buffer 201, via 306, in the next available position. If the position number of the data/key of the current row is the first entry into the order buffer 203, via step 307, then the position number for the data/key is simply stored in the order buffer 203, via step 311. If the position number of the data/key of the current row is not the first entry into the order buffer 203, via step 307, then the entries in the order buffer 303 are searched to determine the new order for the keys in the data buffer 201, via step 308. Optionally, if duplicates are to be avoided, the qualifying row is discarded if an equal key is found in the order buffer 203. The position numbers in the order buffer 303 are then shifted to reflect the new order, via step 309. If there are more rows in the table to be read, via step 310, the method repeats steps 304 through 311 until the data buffer 201 is full.

When a row is read and the data buffer is full, via steps 304 and 305, the key of the current row is compared with the key of the last element in the order buffer 203, via step 312. The last element would be the position number of the highest key in the current order. If the key of the current row is higher than the key of the last element, via step 313, then it does not qualify as one of the first N rows. This row is discarded, via step 314, and the next row is read, via step 304. If the key of the current row is lower than the key of the last element, via step 313, then the data and key in the data buffer 201 corresponding to the last element is replaced with the data and key of the current row, via step 315. The data/key of the current row thus will have the same position number as the data/key of the last element it replaced. A search of the order buffer 203 is then performed to determine the new order for the keys in the data buffer 201, via step 308, and the position numbers in the order buffer 203 are shifted accordingly, via step 309. Steps 304 through 315 are then repeated until all rows of the table have been read.

For example, as illustrated in FIGS. 4A-4I, assume that the following Structured Query Language (SQL) query is processed:

SELECT C1,C2 FROM T3 ORDER BY C1 FETCH FIRST 10 ROWS ONLY;.

Assume that C1 is a char(1) not null and C2 is a char(2) not null.

First, the data buffer 201 is set up, via step 301. Here, the buffer length=(3+1)×10=40 bytes, where 3 is the length of C1 and C2, 1 is the length of the key C1, and 10 is the number of rows to be fetched. The offsets are stored in the offset buffer 202, via step 302, and the order buffer 203 is set up, via step 303.

Figure 4A:
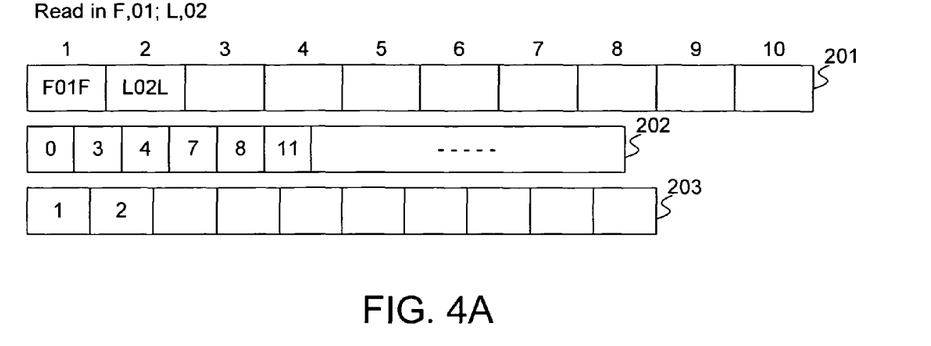
FIG. 4A through 4I illustrate an example of the method in accordance with the present invention. I would like to make the following changes in FIGS. 4A-4I

Assume that a row is read, via step 304, with C1=F, C2=01 and key=F. As illustrated in FIG. 4A, since the data buffer 201 is not full, via step 305, the data/key F01F is stored in the data buffer 201 at position 1, via step 306. Since the position number of the data/key F01F is the first entry in the order buffer 203, '1' is simply stored in the order buffer 203, via step 311.

As illustrated in FIG. 4A, assume that the next row read has C1=L, C2=02 and key=L. Since the data buffer 201 is not full, via step 305, the data/key L02L is stored in the data buffer 201 at position 2, via step 306. The position number of the data/key L02L is not the first entry in the order buffer 203, via step 307, so the order buffer 203 is searched to determine the new order for the keys in the data buffer 301, via step 308. In this embodiment, a sequential search is performed with 4 or less element in the order buffer 203. With more than 4 elements, a binary search is performed. Here, the new order is 1,2.

Figure 4B:
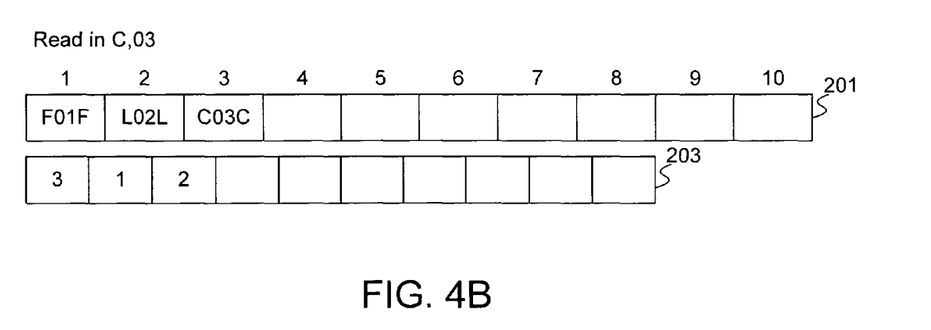

As illustrated in FIG. 4B, assume that the next row read has C1=C, C2=03 and key =C. Since the data buffer 201 is not full, via step 305, the data/key C03C is stored in the data buffer 201 at position 3, via step 306. The position number of the data/key C03C is not the first entry in the order buffer 203, via step 307, so the order buffer 203 is sequentially searched to determine the new order for the keys in the data buffer 301, via step 308. Here, the new order is 3, 1, 2. The position numbers in the order buffer 203 are then shifted to reflect this new order, via step 309.

Figure 4C:
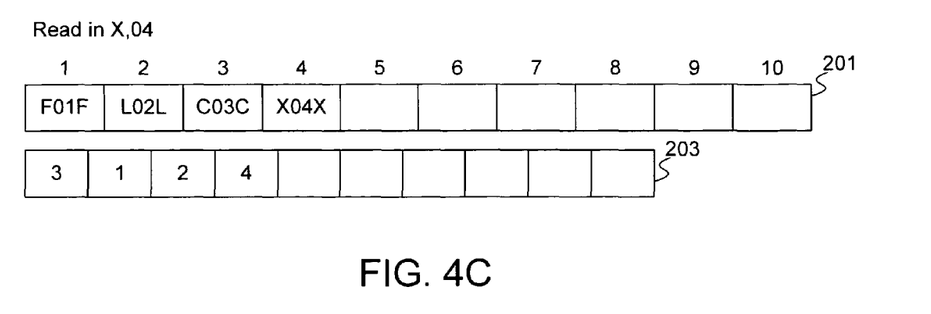

As illustrated in FIG. 4C, assume that the next row read has C1=X, C2=04 and key =X. Since the data buffer 201 is not full, via step 305, the data/key X04X is stored in the data buffer 201 at position 4, via step 306. The position number of the data/key X04X is not the first entry in the order buffer 203, via step 307, so the order buffer 203 is sequentially searched to determine the new order for the keys in the data buffer 201, via step 308. Here, the new order is 3, 1, 2, 4. Since position number '4' is the largest value at this time, no "shift" per se is needed. The position numbers in the order buffer 203 are then shifted to reflect this new order, via step 309.

Figure 4D:
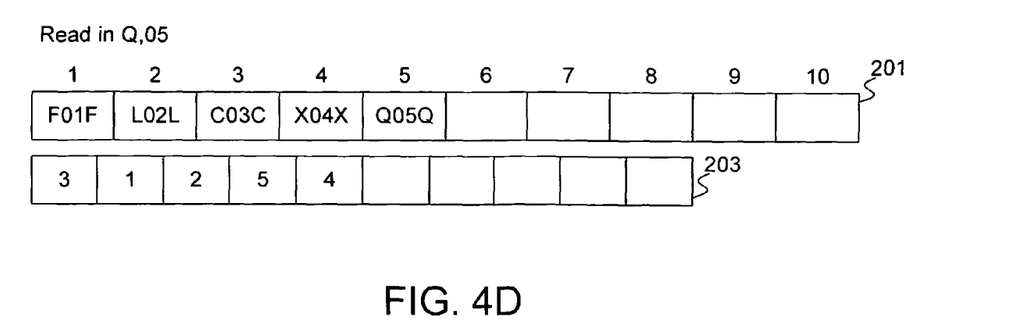

As illustrated in FIG. 4D, assume that the next row read has C1=Q, C2=05 and key =Q. Since the data buffer 201 is not full, via step 305, the data/key Q05Q is stored in the data buffer 201 at position 5, via step 306. The position number of the data/key Q05Q is not the first entry in the order buffer 203, via step 307, so the order buffer 203 illustrated in FIG. 4C is sequentially searched to determine the new order for the keys in the data buffer 201, via step 308. Here, the new order is 3, 1, 2, 5, 4. The position numbers in the order buffer 203 illustrated in FIG. 4C are then shifted, and the position number '5' is stored, to reflect this new order, via step 309. The resulting order buffer 203 is illustrated in FIG. 4D.

Figure 4E:
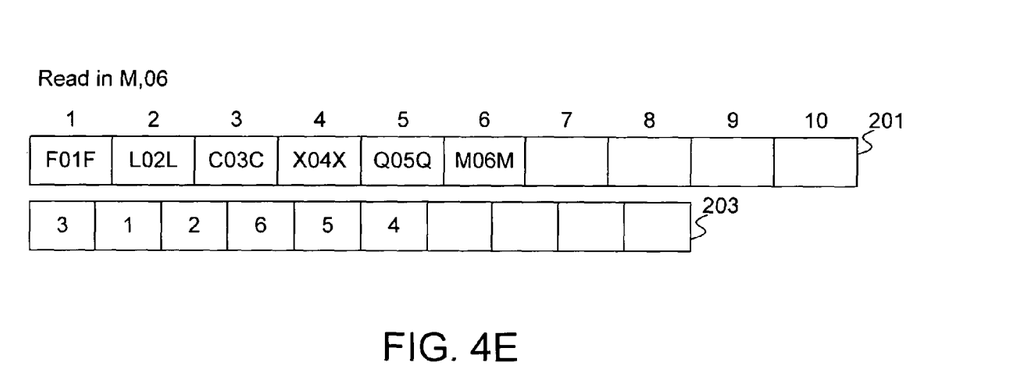

As illustrated in FIG. 4E, assume that the next row read has C1=M, C2=06 and key =M. Since the data buffer 201 is not full, via step 305, the data/key M06M is placed into the data buffer 201 at position 6, via step 306. The position number of the data/key M06M is not the first entry in the order buffer 203, via step 307, so the order buffer 203 illustrated in FIG. 4D is binary searched to determine the new order for the keys in the data buffer 201, via step 308. In a binary search, M is compared with the key for the position in the middle of the order. Here, the middle position is '2'. The key in position 2 is L. M is higher than L, so M is next compared with the next higher position, '5', which has key Q. M is lower than Q. Thus, the new order is 3, 1, 2, 6, 5, 4. The position numbers in the order buffer 203 illustrated in FIG. 4D are then shifted, and the position number '6' is stored, to reflect this new order, via step 309. The resulting order buffer 203 is illustrated in FIG. 4E.

Figure 4F:
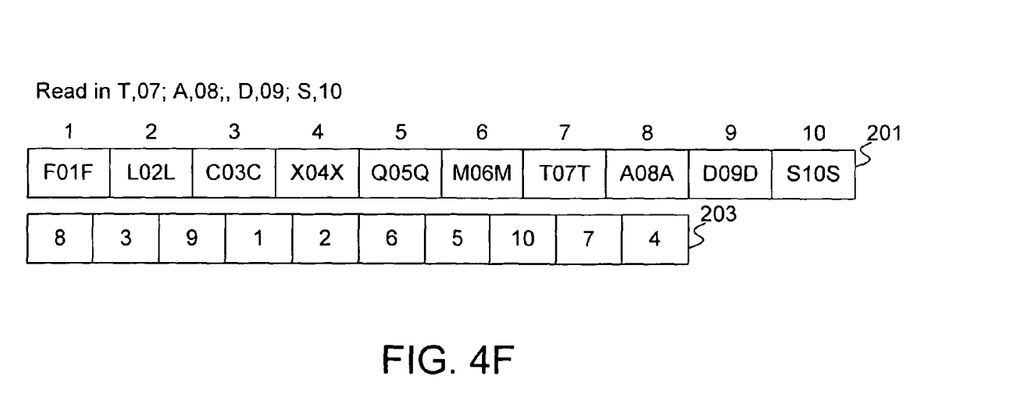

Steps 304 through 311 are repeated for the next rows, with C1=T, A, D, and S and C2=07, 08, 09, 10 respectively. The resulting data buffer 201 and order buffer 203 are illustrated in FIG. 4F.

Figure 4G:
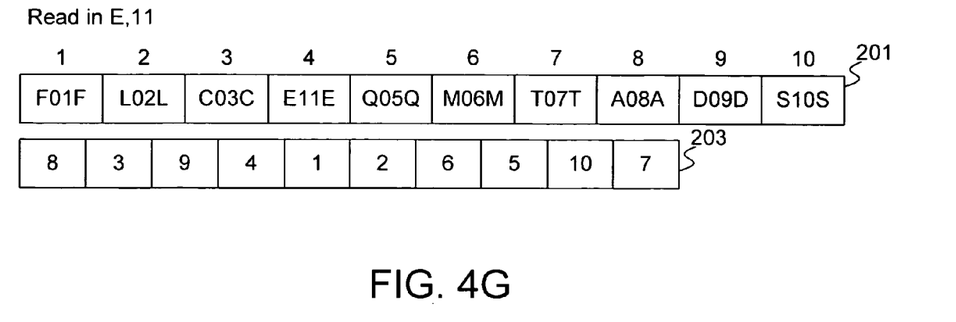

As illustrated in FIG. 4G, assume now that the next row read has C1=E, C2=11 and key=E. Since the data buffer 201 is full, via step 305, the key E is compared with the key of the last element in the order buffer 203 illustrated in FIG. 4F, via step 312. The last element is '4', and its key is X. E is lower than X, via step 313, so E11E qualifies. The data/key E11E then replaces X04X at position 4 in the data buffer 201, via step 315. In a binary search, E is compared with the key for the position in the middle of the order. Here, the middle position is '2'. The key in position 2 is L. E is lower than L. In this case, a second binary search is performed, and the middle position is '9'. The key in position 9 is D. E is higher then D and is next compared sequentially with the next higher position, '1', which has key F. E is lower than F. Thus, the new order is 8, 3, 9, 4, 1, 2, 6, 5, 10, 7. The position numbers in the order buffer 203 illustrated in FIG. 4F are shifted to reflect this new order, via step 309. The resulting order buffer 203 is illustrated in FIG. 4G.

Figure 4H:
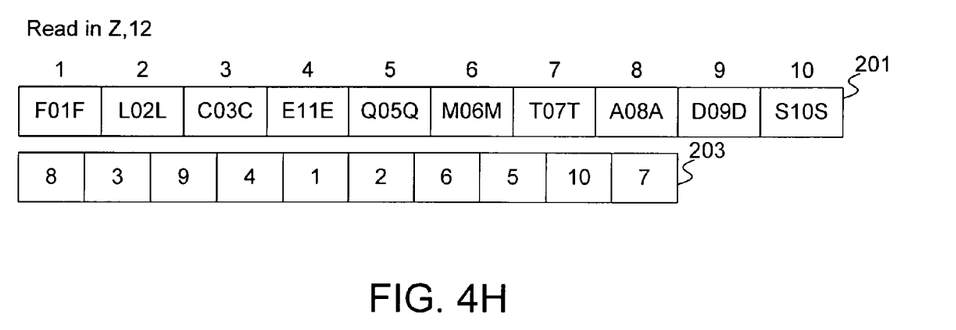

As illustrated in FIG. 4H, assume now that the next row read has C1=Z, C2=12 and key=Z. Since the data buffer 201 is full, via step 305, the key Z is compared with the key of the last element in the order buffer 203 illustrated in FIG. 4G, via step 312. The last element is '7', and its key is T. Z is higher than T, via step 213, so this row is discarded, via step 314. As illustrated in FIG. 4H, the order buffer 203 is not changed.

Figure 4I:
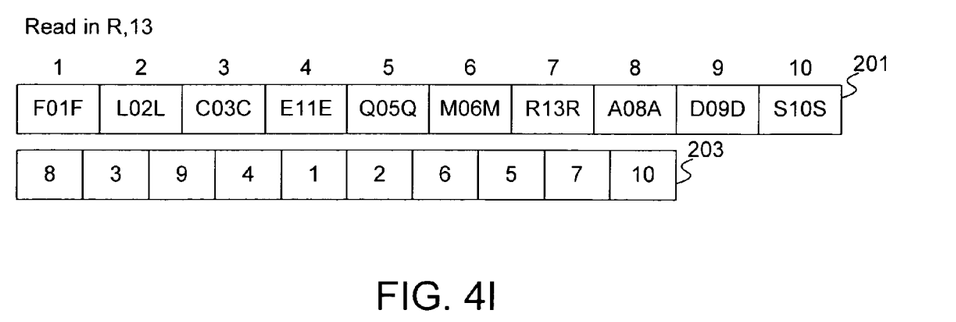

As illustrated in FIG. 4I, assume now that the next row read has C1=R, C2=13 and key=R. Since the data buffer 201 is full, via step 305, the key R is compared with the key of the last element in the order buffer 203 illustrated in FIG. 4H, via step 312. The last element is '7', and its key is T. R is lower than T, via step 313, so R13R qualifies. The data/key R13R then replaces T07T at position 7 in the data buffer 201, via step 315. In a binary search, R is compared with the key for the position in the middle of the order. Here, the middle position is '1'. The key in position 1 is F. R is higher than F, so R is compared with the next higher position, '2', which has key L. R is higher than L, so R is compared with the next higher position, '6', which has key M. R is higher than M, so R is compared with the next higher position, '5', which has key Q. R is higher than Q, so R is compared with the next higher position, '10', which has key S. R is lower than S. Thus, the new order is 8, 3, 9, 4, 1, 2, 6, 5, 7, 10. The position numbers in the order buffer 203 illustrated in FIG. 4H are shifted to reflect this new order, via step 309. The resulting order buffer 203 is illustrated in FIG. 4I.

Although the method is described in the context of the buffers above, one of ordinary skill in the art will understand that other implementations are possible without departing from the spirit and scope of the present invention. For example, only a data buffer may be used, where the data/keys stored in the data buffer are moved each time the order changes. Alternatively, only the data buffer and the offset buffer may be used, where the offsets moved each time the order changes.

A method for a fast fetching of ordered first N rows of a table is disclosed.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

In a particular embodiment, a method for fetching an ordered first N rows of a table is disclosed, where N indicates a number of rows to be fetched. The method includes reading a row of the table. The method includes creating a data buffer to store data and to store keys of qualifying rows. The method includes creating an offset buffer to store offsets to a base address of the data buffer corresponding to the data and the keys stored at the data buffer. The method also includes creating an order buffer to store position numbers corresponding to the data and the keys of qualifying rows stored at the data buffer. A length of the data buffer is based on the lengths of the data and the key of a qualifying row. The method also includes discarding a read row when the read row does not qualify as the first N rows of the table.

The method also includes determining that the read row qualifies as the first N rows of the table for rows read so far and storing data of the read row when the read row qualifies. The method also includes storing the data and a key of the read row at the data buffer when the data buffer is not full. When the data buffer is full, the method also includes comparing a key of the read row with a key of a last element of the order buffer, and replacing a data and the key of the data buffer corresponding to the last element with the data and the key of the read row when the key of the read row is lower than the key of the last element. The method also includes discarding the read row when the key of the read row is higher than the key of the last element.

The method also includes determining an order of data of qualifying rows and storing the order at the order buffer. The method also includes determining whether a position number is a first or a second entry of the order buffer, where the position number corresponds to the data and the key of the read row. The method includes searching the order buffer to determine an order of keys for the qualifying rows and shifting the position numbers in the order buffer to reflect the determined order. The method includes storing the position number at the order buffer.

In a particular embodiment, a computer readable medium includes program instructions, that when executed by a processor, cause the processor to fetch an ordered first N rows of a table, where N is a number of rows to be fetched. The computer readable medium also includes program instructions, that when executed by the processor, cause the processor to read a row of the table. The program instructions to read the row include program instructions to create a data buffer to store data and keys of qualifying rows. The program instructions to read the row include program instructions to store, at an offset buffer, offsets to a base address of the data buffer corresponding to the data and the keys stored in the data buffer. The program instructions to read the row include program instructions to create an order buffer to store position numbers corresponding to the data and the keys stored of the qualifying row at the data buffer. The length of the data buffer is based on the length of the data and based on the key for a qualifying row.

The computer readable medium also includes program instructions, that when executed by the processor, cause the processor to determine that the read row qualifies as the first N rows of the table for rows read so far and to store data of the read row. The program instructions to determine that the read row qualifies include program instructions to determine that the data buffer is not full and storing the data and a key of the read row in the data buffer when the data buffer is not full. The program instructions to determine that the read row qualifies include program instructions to determine that the data buffer is full, to compare a key of the read row with a key of a last element in an order buffer, and to replace data and the key in the data buffer corresponding to the last element with the data and the key of the read row when the key of the read row is lower than the key of the last element. The program instructions to determine that the read row qualifies include program instructions to discard the read row when the key of the read row is higher than the key of the last element.

The computer readable medium also includes program instructions, that when executed by the processor, cause the processor to determine an order of data of qualifying rows and to store the order. The program instructions to determine the order include program instructions to determine whether a position number is a first or second entry of the order buffer. The position number corresponds to the data and a key of the read row, and the program instructions store the position number in the order buffer. The program instructions to determine the order include program instructions to search an order buffer to determine a new order of keys of the qualifying rows and to shift the position numbers of the order buffer to reflect the new order. The computer readable medium also includes program instructions, that when executed by the processor, cause the processor to discard the read row if the read row does not qualify as the first N rows.

What is claimed is:

1. A method, comprising:
   receiving a request to retrieve a number of rows of a table, wherein the retrieved number of rows are ordered;
   creating a fixed-size data buffer having a base address, wherein a data offset from the base address identifies each row stored at the data buffer, wherein a key offset from the base address identifies a key of each row stored at the data buffer, and wherein a number of elements in the data buffer is equal to the number of rows to be retrieved;
   creating a fixed-size order buffer to store a position number and the key of each row stored at the data buffer, wherein a number of elements in the order buffer is equal to the number of rows to be retrieved, and wherein the position number indicates a position of each row stored at the data buffer;
   creating an offset buffer to store the data offset and the key offset of each row stored at the data buffer, wherein each of the data buffer, the order buffer, and the offset buffer is entirely stored in a non disk-based memory;
   for each particular row of the table, wherein the particular row has a corresponding key:
   when the corresponding key of the particular row is less than a stored key of a last entry of the order buffer:
      replacing a row of the data buffer with the particular row;
      storing the data offset and the key offset associated with the particular row at the offset buffer; and
      reordering the order buffer based on a comparison of the key corresponding to the particular row to the key of each row stored at the data buffer, wherein the key of each row stored at the data buffer is located via the key offset corresponding to each row; and
   returning the rows stored in the data buffer in an order determined by the position numbers from the order buffer as the ordered number of rows of the data table.

2. The method of claim 1, further comprising:
   determining whether the data buffer has an empty entry;
   when the data buffer has the empty entry, storing the particular row and the key corresponding to the particular row at the empty entry of the data buffer;
   storing the data offset and the key offset associated with the particular row at the offset buffer; and
   storing a position number of the particular row and the key corresponding to the particular row in an entry of the order buffer.

3. The method of claim 1, further comprising performing a search of the order buffer to determine an order of the stored keys of the order buffer.

4. The method of claim 3, wherein searching the order buffer comprises performing a sequential search of the order buffer when the order buffer has less than five stored keys.

5. The method of claim 3, wherein searching the order buffer comprises performing a binary search of the order buffer when the order buffer has more than four stored keys.

6. The method of claim 3, wherein searching the order buffer comprises:
   comparing the key corresponding to the particular row to each stored key of the order buffer; and
   identifying a position number of the particular row based on the comparison.

7. The method of claim 6, wherein reordering the order buffer comprises:
   performing a right shift of position numbers corresponding to stored keys that are greater than the key corresponding to the particular row to create an empty order buffer entry at the identified order position of the order buffer; and
   storing the position number of the particular row at the empty order buffer entry.

8. The method of claim 1, further comprising discarding the particular row when a key corresponding to the particular row is greater than the stored key of the last entry of the order buffer.

9. The method of claim 1, wherein an ordering of elements at the order buffer is updated as each row is replaced at the data buffer.

10. A computer program product comprising a computer readable storage medium having computer readable program code embodied therewith, the computer readable program code executable by a processor to:
   receive a request to retrieve a number of rows of a table, wherein the retrieved number of rows are ordered;
   create a fixed-size data buffer having a base address, wherein each row stored at the data buffer is identifiable via an offset from the base address, and wherein a number of elements in the data buffer is equal to the number of rows to be retrieved;
   create a fixed-size order buffer to store a position number and a key associated with each row stored at the data buffer, wherein a number of elements in the order buffer is equal to the number of rows to be retrieved, and wherein the position number indicates a position of a corresponding row of the data buffer;
   create an offset buffer to store a data offset and a key offset associated with each row of the data buffer, wherein the data offset identifies a first offset from the base address of an entry stored at the data buffer, wherein the key offset identifies a second offset from the base address of a key of the entry of the data buffer, and wherein each of the data buffer, the order buffer, and the offset buffer is entirely stored in a non disk-based memory;
   for each particular row of the table, wherein the particular row has a corresponding key:
   when the corresponding key of the particular row is less than a stored key of a last entry of the order buffer:
      replace a row of the data buffer with the particular row;

store the data offset and the key offset associated with the particular row at the offset buffer; and reorder the order buffer based on a comparison of the key corresponding to the retrieved row to the key of each row stored at the data buffer, wherein the key of each row stored at the data buffer is located via the key offset corresponding to each row; and return the rows stored in the data buffer in an order determined by the position numbers from the order buffer as the ordered number of rows of the data table.

11. The computer program product of claim 10, wherein the computer readable program code is further executable by the processor to:

determine whether the data buffer has an empty entry;

store the particular row and the key corresponding to the particular row at the empty entry of the data buffer when the data buffer has the empty entry;

store the data offset and the key offset associated with the particular row at the offset buffer; and store a position number of the particular row and the key corresponding to the particular row in an entry of the order buffer.

12. The computer program product of claim 10, wherein the computer readable program code is further executable by the processor to search the order buffer by performing a sequential search of the order buffer when the order buffer has less than five stored keys.

13. The computer program product of claim 10, wherein the computer readable program code is further executable by the processor to search the order buffer by performing a binary search of the order buffer when the order buffer has more than four stored keys.

14. The computer program product of claim 10, wherein the computer readable program code is further executable by the processor to:

compare the key corresponding to the particular row to each stored key of the order buffer; and identify a position number of the particular row based on the comparison.

15. The computer program product of claim 14, wherein the computer readable program code is further executable by the processor to:

perform a right shift of position numbers corresponding to stored keys that are greater than the key corresponding to the particular row to create an empty order buffer entry at an identified order position of the order buffer; and store the position number of the particular row at the empty order buffer entry.

16. The computer program product of claim 10, wherein the computer readable program code is further executable by the processor to discard the particular row when a key corresponding to the particular row is greater than the stored key of the last entry of the order buffer.

17. The computer program product of claim 10, wherein the computer readable program code is further executable by the processor to update an ordering of elements at the order buffer as each row is replaced at the data buffer.

18. A computer system, comprising:

a processor;

a disk-based storage device; and a primary memory comprising instructions, that when executed by the processor, cause the processor to:

receive a request to retrieve a number of rows of a table, wherein the retrieved number of rows are ordered;

create a fixed-size data buffer at the primary memory having a base address, wherein each row of the fixed-size data buffer is identifiable via an offset from the base address, and wherein a number of elements in the fixed-size data buffer is equal to the number of rows to be retrieved from the table;

create a fixed-size order buffer at the primary memory to store a position number and a key associated with each row stored at the fixed-size data buffer, wherein a number of elements in the fixed-size order buffer is equal to the number of rows to be retrieved from the table, and wherein the position number indicates a position of a corresponding row of the data buffer;

create an offset buffer at the primary memory to store a data offset and a key offset associated with each row of the fixed-size data buffer, wherein the data offset identifies a first offset from the base address of a row stored at the fixed-size data buffer, and wherein the key offset identifies a second offset from the base address of a key of the row stored at the fixed-size data buffer;

for each particular row of the table having a corresponding key:

when the corresponding key of the particular row is less than a stored key of a last entry of the fixed-size order buffer:

replacing a row of the fixed-size data buffer with the particular row;

storing the data offset and the key offset associated with the particular row at the fixed-size offset buffer; and reordering the fixed-size order buffer based on a comparison of the key corresponding to the particular row to the key of each row stored at the fixed-size data buffer, wherein the key of each row stored at the fixed-size data buffer is located via the key offset corresponding to each row stored at the fixed-size data buffer.

19. The computer system of claim 18, wherein the instructions, when executed, further cause the processor to return the rows stored in the fixed-size data buffer in an order determined by the position numbers from the fixed-size order buffer.

20. The computer system of claim 19, wherein the number of rows of the data table are retrieved and ordered without writing data to the disk-based storage device.

* * * * *